United States Patent [19]
Sakurai

[11] Patent Number: 5,909,538
[45] Date of Patent: *Jun. 1, 1999

[54] OUTPUT APPARATUS

[75] Inventor: Masakatsu Sakurai, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/582,912

[22] Filed: Jan. 4, 1996

Related U.S. Application Data

[62] Division of application No. 08/247,403, May 23, 1994, Pat. No. 5,502,794, which is a continuation of application No. 07/532,564, Jun. 4, 1990.

[30] Foreign Application Priority Data

| Jun. 5, 1989 | [JP] | Japan | 1-141113 |
| Jun. 5, 1989 | [JP] | Japan | 1-142370 |

[51] Int. Cl.$^6$ .................................................. G06H 15/00
[52] U.S. Cl. ........................................... 395/115; 395/102
[58] Field of Search ..................... 395/102, 112, 395/114, 115, 116, 113, 109; 358/261.1, 261.2, 261.4, 443, 444, 404

[56] References Cited

U.S. PATENT DOCUMENTS

| 3,895,184 | 7/1975 | Komura et al. | 395/115 |
| 4,811,247 | 3/1989 | Marsh | 395/102 |
| 4,884,147 | 11/1989 | Arimoto et al. | 395/114 |
| 5,068,805 | 11/1991 | Tsuzuki | 395/164 |

FOREIGN PATENT DOCUMENTS

| 0012793 | 7/1980 | European Pat. Off. . |
| 62-180665 | 8/1987 | Japan . |
| 2224187 | 4/1990 | United Kingdom . |

*Primary Examiner*—Arthur G. Evans
*Attorney, Agent, or Firm*—Fitzpatrick, Cella, Harper & Scinto

[57] ABSTRACT

There is provided an output apparatus in which an output resolution can be changed and a memory medium including character information of printing dot patterns is detachable. The memory medium has holding means for storing and holding output density information of dot patterns of characters stored in the memory medium. The apparatus comprises in one embodiment: reading means for reading out the output density information from the memory medium; and changing means for changing the output resolution on the basis of the output density read out by the reading means. When the output density information read out by the reading means differs from the printing resolution of the apparatus itself in the reading mode, the character information of the dot pattern in the memory medium is not used. With the apparatus, even if the number of dots constructing a character is changed, the character pattern can be automatically output at the optimum output resolution.

40 Claims, 8 Drawing Sheets

OUTPUT APPARATUS

This application is a division of application Ser. No. 08/247,403, filed May 23, 1994, now U.S. Pat. No. 5,502,794, which is a continuation of application Ser. No. 07/532,564, filed Jun. 4, 1990.

BACKGROUND OF THE INVENTION

1. Field of the Invention

The present invention relates to an output apparatus which can change an output resolution.

2. Related Background Art

Hitherto, in a printing apparatus which handles dot pattern characters, when printing resolution is changed, the apparatus copes with such a change in printing resolution by handling the dot pattern characters as a character size different from the character size which has been used so far (for instance, a character of the 10-point size when the resolution is set to 400 dpi is regarded as a character of the 20-point size when the resolution is set to 200 dpi) or by executing a correction to thin out the dots or the like.

However, in the above conventional example, since priority has been given to the display resolution, there is an inconvenience that if the resolution is changed slightly, no corresponding dot pattern character exists. On the contrary, when dot pattern characters are changed, the resolution becomes improper and the unfit printing is executed.

On the other hand, in recent years, although a printing apparatus using vector fonts (outline fonts) has been put into practical use, in such an apparatus, since upon printing and outputting, the process to generate character patterns is preferred every time the printing operation is executed, it is inevitable that the throughput of the apparatus deteriorates.

Hitherto, there has been proposed a printing apparatus constructed in a manner such that when an image is printed onto a recording paper, its printing density can be changed.

Upon setting of the printing density of such a printing apparatus, it is predetermined by an initial value or is changed by a designation of a command or the like.

However, in the above conventional example, since the printing density has been set irrespective of a memory capacity, for example there is a case where in spite of the fact that a sufficient memory capacity is provided, the printing is executed at a low density, so that the printing of a low quality is obtained, or where, although the capacity is small, the operator intends to execute printing of a high density, the throughput deteriorates or an over-memory (overflow of memory) or the like occurs. Particularly, in such a printing apparatus, an apparatus which can expand the RAM also exists. In such a case, there frequently occurs a situation that a set value of the printing density is improper for the capacity of the expanded auxiliary RAM.

SUMMARY OF THE INVENTION

The present invention is made in consideration of the above problems and it is an object of the invention to provide an output apparatus which can change a resolution, wherein even if the number of dots constructing a character is changed, the character can be automatically output at an optimum output resolution.

Another object of the invention is to provide an output apparatus in which a throughput of an output process by vector fonts can be improved.

Still another object of the invention is to provide an output apparatus in which the most effective image output state can be obtained by an output density according to memory capacity.

Still another object of the invention is to provide an output apparatus which can variably change an output density to an output section and can also change a memory capacity, wherein the apparatus has changing means for changing the output density and detecting means for detecting the memory capacity and the output density is changed in accordance with the memory capacity.

Still another object of the invention is to provide an output apparatus in which by obtaining the optimum output density from a usable memory size, the optimum printing quality and printing speed and the like can be obtained.

DETAILED DESCRIPTION OF THE PREFERRED EMBODIMENTS

Embodiments according to the present invention will be described in detail hereinbelow with reference to the drawings.

<Description of the First Embodiment (FIGS. 1 and 2)>

Figure 1:
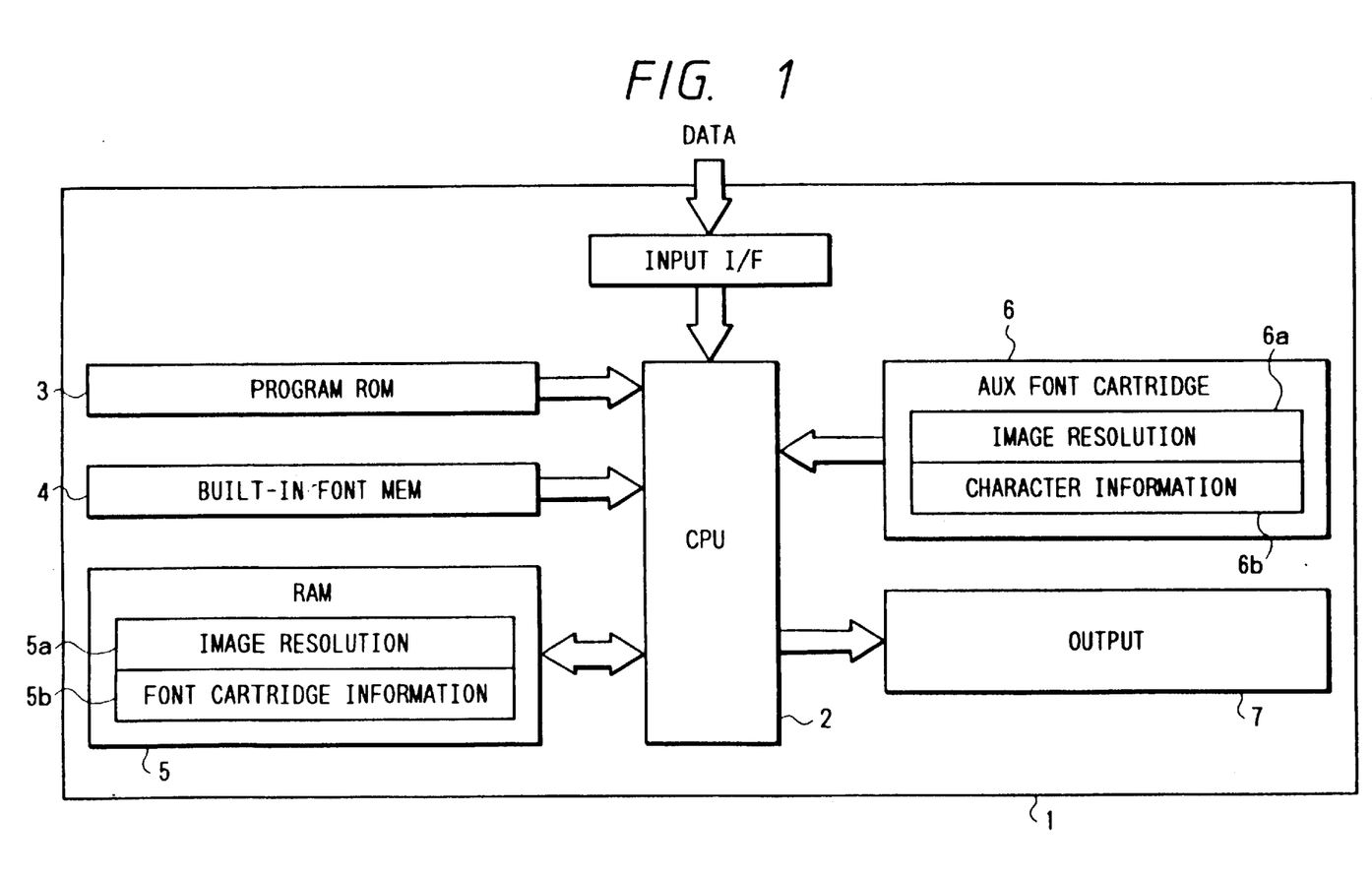
FIG. 1 is a block arrangement diagram of a printing apparatus according to the first embodiment of the invention.

FIG. 1 is an arrangement diagram of a printing apparatus as an output apparatus in the embodiment.

Figure 2:
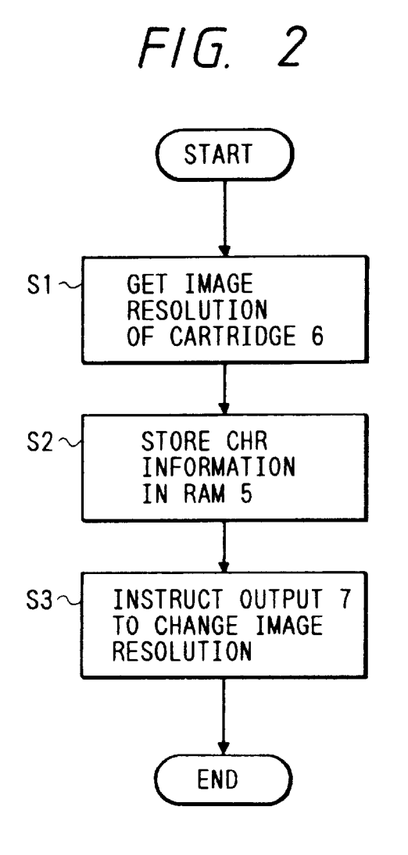
FIG. 2 is a flowchart for explaining a processing procedure of a CPU in the first embodiment.

In the diagram, reference numeral 1 denotes a printing apparatus main body; 2 indicates a CPU to control each of component elements in the printing apparatus main body 1; 3 a ROM in which not only a program regarding the print control but also programs based on a flowchart shown in FIG. 2, which will be explained hereinafter, are stored; 4 a built-in font memory in which character patterns corresponding to character codes are stored and which is provided as standard equipment; and 5 a RAM which is used as a work area of the CPU 2 during the operation of the CPU 2. The RAM 5 has therein: an image resolution storage section 5a to store data indicative of the resolution in the present printing state; and a font cartridge information section 5b to store information to access character information in a font cartridge, which will be explained hereinlater. Reference numeral 6 denotes a font cartridge having a structure which is detachably connectable to an external slot (not shown) of the printing apparatus main body 1. The font cartridge 6 has therein: a character font section (not shown) in which character patterns are stored; an image resolution information section 6a in which output resolution suitable for a group of character patterns stored are stored; and a character information section 6b in which information necessary to access actual character patterns (for instance, address information of each character pattern and the like) is stored. Reference numeral 7 denotes an output section to print by the output resolution instructed by the CPU 2. The output section 7 comprises a printing system by, for instance, a laser beam. Since the recording resolution can be controlled by controlling an output rate of a video signal which is output to the printing system and a conveying speed of a recording paper, the detailed explanation of the output section 7 is omitted here. The same also applies to the display.

A processing procedure of the operation of the CPU 2 in the embodiment with the above construction will now be described with reference to the flowchart of FIG. 2.

When a power source of the printing apparatus is turned on, in step S1, the CPU 2 reads the content of the image resolution information section 6a in the font cartridge 6 connected to the external slot and stores the read-out data into the image resolution storage section 5a in the RAM 5. In the next step S2, the CPU 2 reads out the character information from the character information section 6b in the font cartridge 6 and stores the read-out information into the font cartridge information section 5b. In step S3, the CPU 2 instructs the switching of the resolution of the output section 7 so as to obtain the resolution of the value stored in the image resolution storage section 5a. After that, the character pattern corresponding to the character code which was input from the outside is read out of the font cartridge 6 on the basis of the information stored in the font cartridge information section 5b, and the read-out character pattern is output to the output section 7.

As mentioned above, the apparatus can print at the output resolution written in the font cartridge 6 It is assumed that the processes in steps S1 to S3 mentioned above are executed not only when the power source is turned on but also when the font cartridge is exchanged for another font cartridge. It will be obviously understood that a switch to detect the loading/unloading state of the cartridge and the like are also provided in the apparatus. The same also applies to the case, which will be explained hereinafter. On the other hand, in addition to the font cartridge, another disk device CDROM, or the like can be also used.

<Description of the Second Embodiment (FIG. 3)>

In the above description, when the font cartridge was loaded, the printing is executed at the resolution suitable for the font cartridge loaded. However, when a font cartridge containing dot patterns of a number of dots which the apparatus cannot cope with is connected, there occurs an inconvenience that a character of a size which the user doesn't desire is printed.

Figure 3:
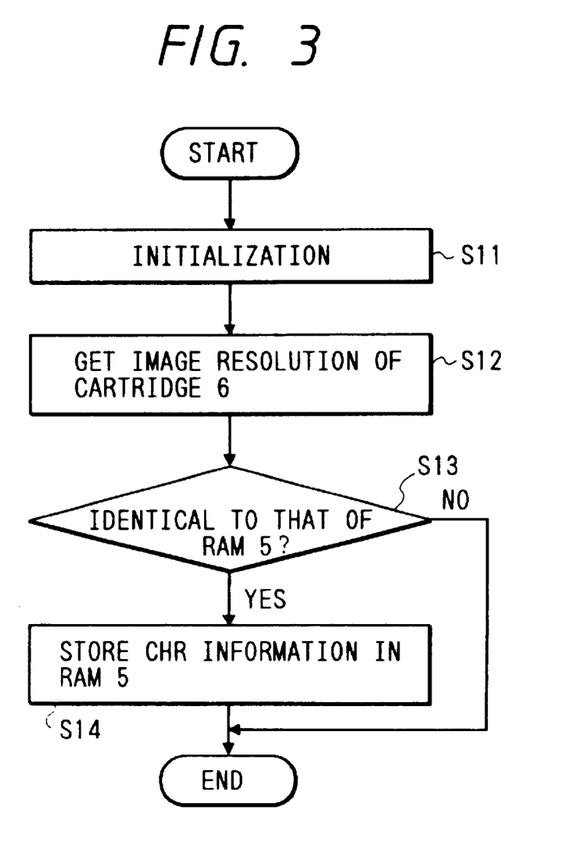
FIG. 3 is a flowchart for explaining a processing procedure of a CPU in the second embodiment.

The content of the processes in such a case will now be described with reference to a flowchart of FIG. 3. It is now assumed that the construction of the apparatus in the case of FIG. 3 is the same as that in FIG. 1.

First, when the power source of the printing apparatus main body is turned on, in step S11, the output resolution which has previously been stored in the program ROM 3 is stored into the image resolution storage section 5a and the output resolution is instructed to the output section 7. In step S12, the data in the image resolution information section 6a, in the font cartridge 6 is extracted. In step S13, a check is made to see if the extracted data and the present output resolution stored in the image resolution storage section 5a coincide or not. It YES in step S13, the data in the character information section 6b in the font cartridge 6 is fetched and stored into the font cartridge information section 5b in the RAM 5. Thus, the character pattern stored in the font cartridge 6 can be accessed. On the contrary, if NO in step S13, the data is not stored into the font cartridge information section 5.

By the above processes, only the data in which the output resolution provided in the font cartridge and the present output resolution of the printing apparatus coincide is stored into the RAM and used as an output.

On the other hand, it is assumed that the processes in steps S12 to S14 are executed not only when the power source was turned on but also when the output resolution was changed (for instance, such a change is instructed from an operation panel (now shown)) or when the font cartridge was changed (on the basis of the data from the detection switch).

<Description of the Third Embodiment (FIGS. 4 and 5)>

Figure 4:
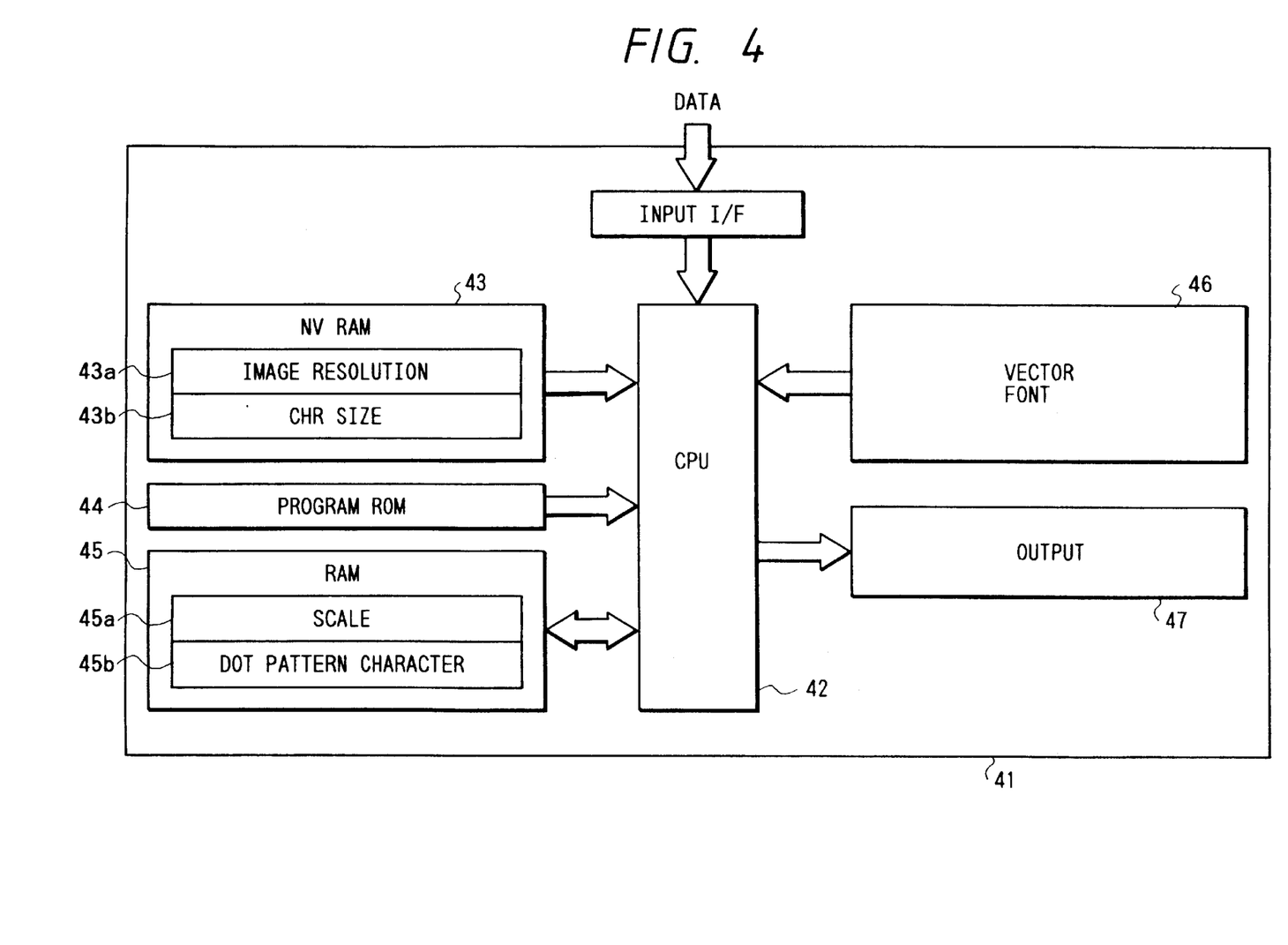
FIG. 4 is a block arrangement diagram of a printing apparatus in the third embodiment.

FIG. 4 shows a block arrangement diagram of a printing apparatus in the third embodiment.

In the diagram, reference numeral 41 denotes an apparatus main body; 42 a CPU; and 43 an NVRAM as a nonvolatile writable memory. The NVRAM 43 has therein: an image resolution storage section 43a in which an output resolutions upon initialization is stored; and a character size storage section 43b in which a character size (point number in the embodiment) to be formed upon initialization is stored. Reference numeral 44 denotes a program ROM. Not only a program regarding the printing process but also programs of a flowchart of FIG. 5, which will be explained hereinafter, are also stored in the program ROM 44. Reference numeral 45 indicates a RAM which is used as a work area of the CPU 42. The RAM 45 has therein: a scale storage section 45a to store a multiplying factor for a standardized character in a vector font section 46, which will be explained hereinafter, in accordance with the resolution and character size stored in the NVRAM 43; and a dot pattern character storage section 45b to store the dot pattern character generated at the multiplying factor of the scale. Reference numeral 46 denotes the vector font section (comprising an ROM or the like). Character data in which outlines of characters were defined in the standardized X-Y coordinates is stored in the vector font section 46. Reference numeral 47 indicates an output section which can print at an arbitrary resolution.

Figure 5:
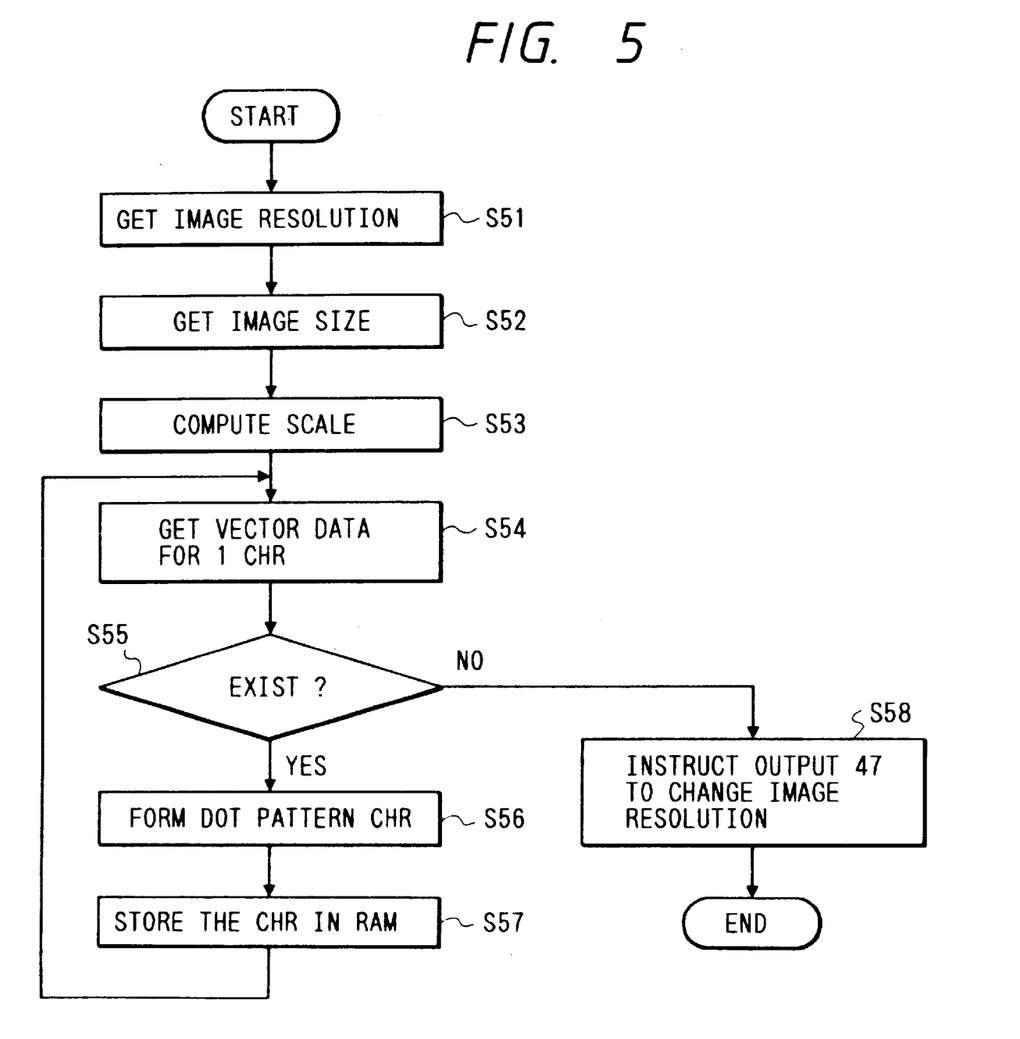
FIG. 5 is a flowchart for explaining a processing procedure of a CPU in the third embodiment.

The content of the processes in the third embodiment with the above construction will now be described with reference to the flowchart of FIG. 5.

First, when the power source of the apparatus is turned on, in step S51, the output resolution information is read out of the image resolution storage section 43a in the NVRAM 43. In step S52, the logic character size (point number) is extracted from the character size storage section 43b. In step S53, the scale is calculated from the information extracted by the processes in steps S51 and S52. The scale is calculated by the following equation:

$$\text{Scale} = \frac{resol \times pts}{72 \times em}$$

where,
em: fundamental size to specify the character size when the vector is standardized,
pts: point number (1 pts=1/72 inch), and
resol: resolution (the number of output dots per inch).

On the other hand, in step S53, further, the calculated scale is stored into the scale storage section 45a.

In the next step S54, the vector data of one character is extracted from the vector font section 46. If no character data to be extracted exists in step S54, the processing routine advances to step S58. An example in which the vector data of one character was extracted will now be described. In this case, the processing routine advances to step S56.

In step S56, the scale which has already been calculated is multiplied by the extracted vector data of one character, thereby converting the coordinate value in the standardized coordinate system into the coordinate value in the output coordinate system. The portions between the respective outline points are further connected by straight lines or the like. The inside of the outline is painted out. Thus, a dot pattern character is formed. Then, the formed character is stored into the dot pattern character storage section 45b in the RAM 45 and the processing routine is returned to step S54. In a manner similar to the above, there are repeated the processes such that the vector information of one character is sequentially read out of the vector font section 46 and the corresponding character pattern is formed and stored into the dot pattern character storage section 45b. After completion of the storage of the dot pattern based on the vector data of the last character, the answer in the discriminating step S55 becomes "NO". In this case, the processing routine advances to step S58 and the output resolution at that time is instructed to the output section 47. After that, as a character pattern corresponding to the received character code, by outputting the dot pattern stored in the dot pattern character storage section 45b in the RAM 45 to the output section 47, the printing is executed.

By the above processes, by forming the dot pattern character of the resolution and logic character size instructed in the NVRAM upon initialization, it is prevented that a character of an unexpected size will be printed and output.

It is assumed that the processes in steps S51 to S58 are executed not only when the power source is turned on but also when resetting, when switching the resolution when changing the character size, or the like.

<Description of the Fourth Embodiment (FIGS. 6 and 7)>

In the above third embodiment, when the resolution was changed, it is necessary to form a dot pattern character which can cope with the resolution after it was changed and it is presumed that the throughput of the printing apparatus itself deteriorates due to the resolution change. In the fourth embodiment, therefore, an apparatus for solving such a problem will be described.

Figure 6:
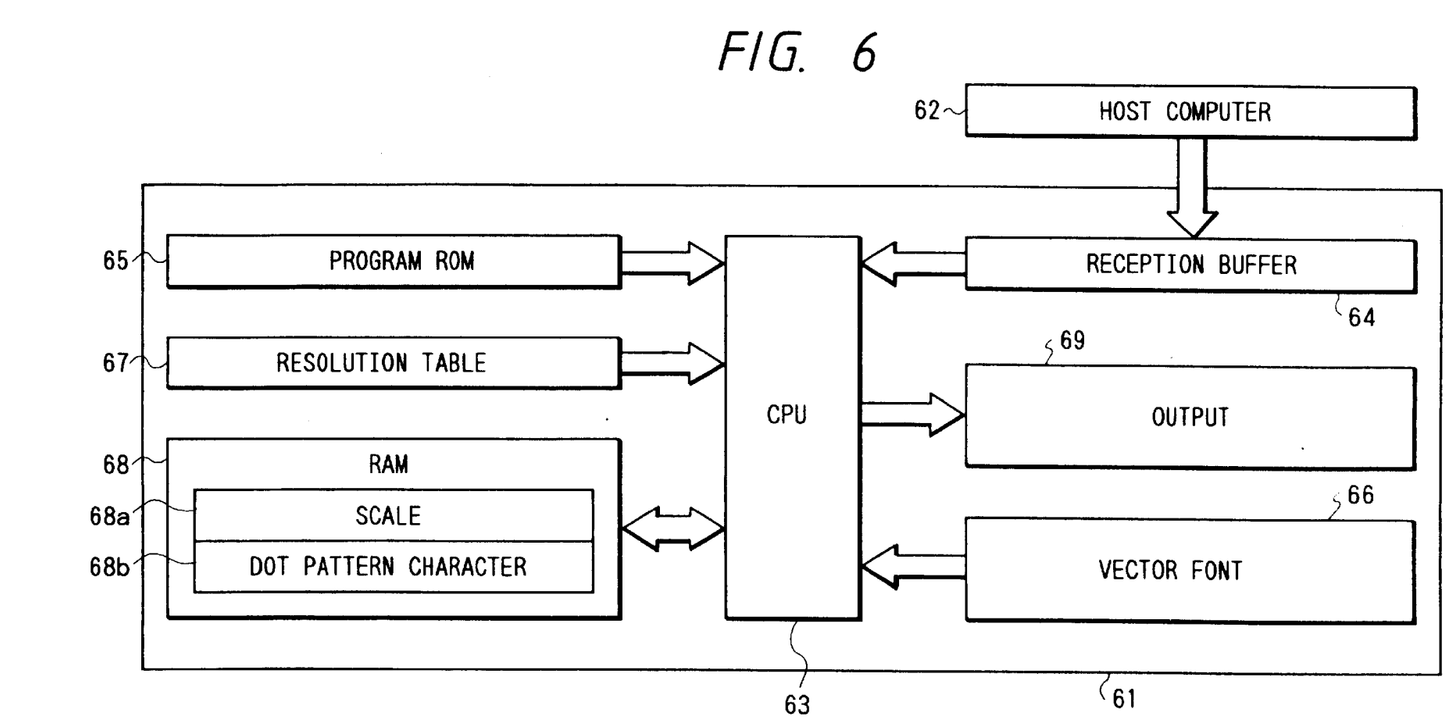
FIG. 6 is a block arrangement diagram of a printing apparatus in the fourth embodiment.
Figure 7:
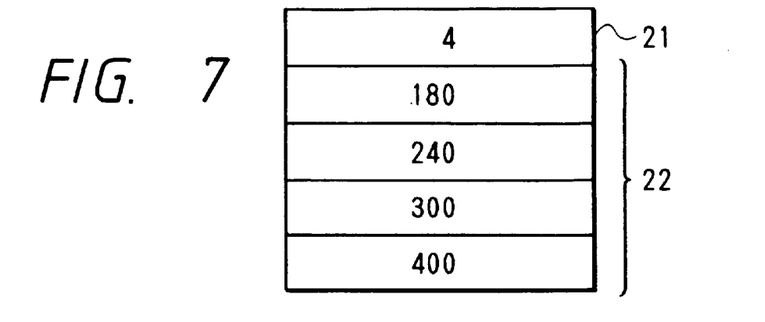
FIG. 7 is a diagram showing the content of a resolution table in the fourth embodiment.

FIG. 6 shows a construction of a printing apparatus in the fourth embodiment.

In the diagram, reference numeral 61 denotes an apparatus main body and 62 indicates a host computer which outputs data. The apparatus main body 61 has the following components therein.

Figure 8:
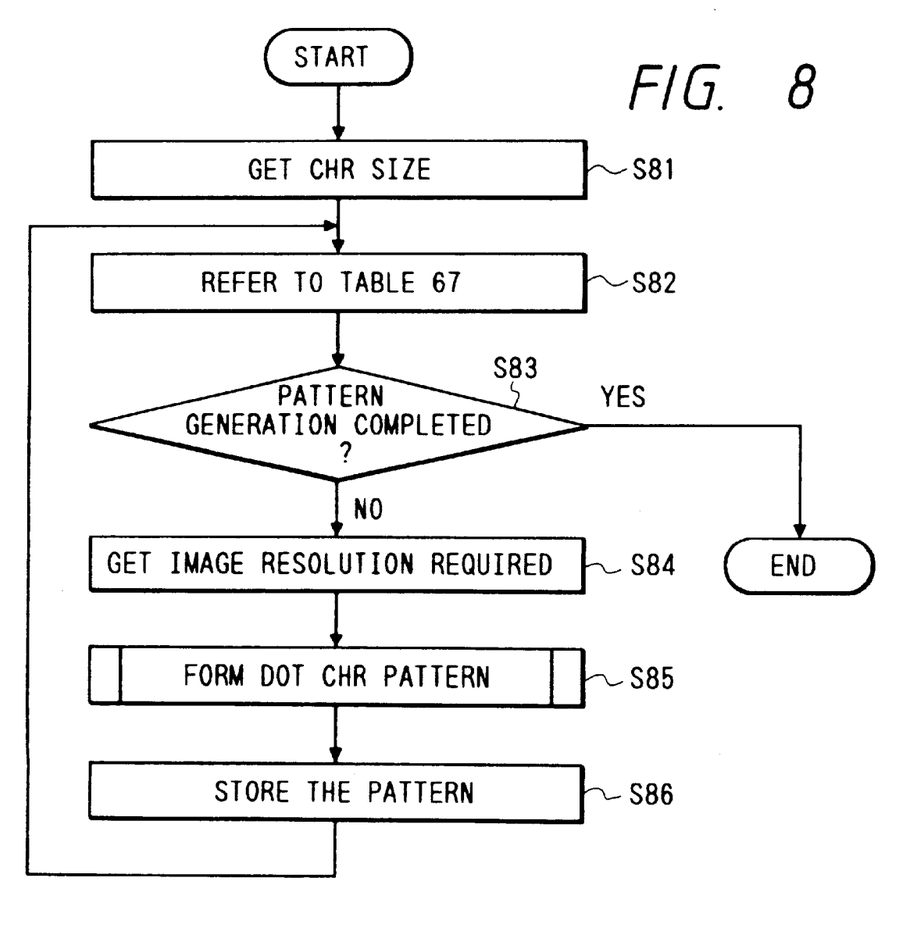
FIG. 8 is a flowchart for explaining a processing procedure of CPU in the fourth embodiment.
Figure 9:
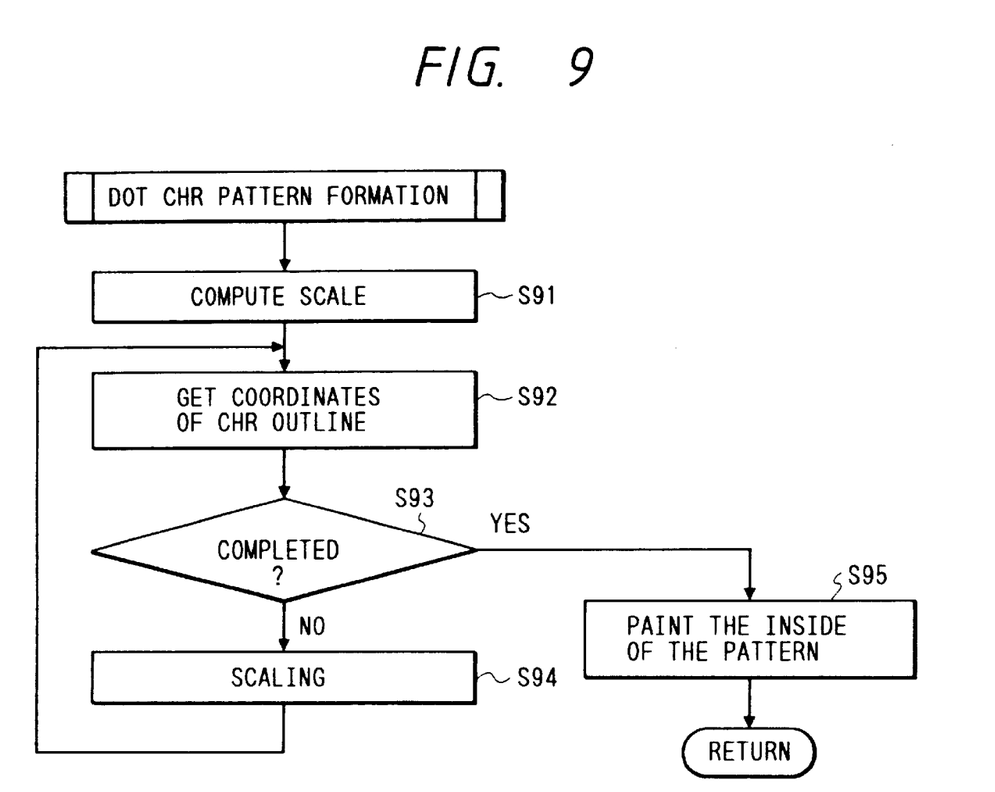
FIG. 9 is a flowchart for explaining the details of a part of the flowchart of FIG. 8.

Reference numeral 63 denotes a CPU to control the whole apparatus main body; 64 a reception buffer to temporarily store the data received from the host computer 62; and 65 a program ROM in which a processing procedure of the operation of the CPU 63 is stored. Not only a program regarding the printing process but also programs regarding flowcharts shown in FIGS. 8 and 9 are stored. Reference numeral 66 denotes a vector font section in which character data in which outlines of characters were defined in the standardized coordinate system is stored. Reference numeral 67 indicates a resolution table in which resolutions which can be output by the printing apparatus 61 are stored as shown in, for instance, FIG. 7. The number of kinds of resolutions which can be output by the printing apparatus is stored in a column 21 in the table shown in FIG. 7 and the resolutions are stored in columns 22. In the column showing each resolution, information which is enough to realize the resolution such as video signal output rate when printing at such a resolution, conveying speed of a recording paper, and the like is stored. Reference numeral 68 indicates an RAM which is used as a work area of the CPU. The RAM 68 has therein: a scale storage section 68a for storing a multiplying factor for the standardized character in the vector font section 66 in accordance with the character size and resolution which were designated by the host computer; and a dot pattern character storage section 68b to store a dot character pattern generated at the multiplying factor of the scale. Reference numeral 69 denotes an output section which can print and output at all of the resolutions in the resolution table 67.

An operation processing procedure in the fourth embodiment with the above construction will now be described with reference to the flowcharts of FIGS. 8 and 9.

First, in step S81, when the logic character size data is received from the host computer through the reception buffer 64, the processing routine advances to step S82 and the resolution table 67 is referenced. In step S83, a check is made to see if the generation of the character patterns corresponding to all of the resolutions has been completed or not. If NO in step S83, step S84 follows and the resolution to be generated is extracted from the resolution table 67. Then, the dot character pattern is formed in step S85. The content of the process in step S85 will be further described in detail in accordance with the flowchart of FIG. 9.

First, in step S91, a scale is calculated and stored into the scale storage section 68a. Since the calculating equation of the scale is the same as that in the third embodiment, it is omitted here. In the next step S92, a group of outline coordinates of one character are extracted from the vector font section 61. In step S93, a check is made to see if the generation of the outline of the character pattern based on the coordinate values has been completed or not. If NO in step S93, step S94 follows and the scale stored in the scale storage section 68a is extracted and multiplied with the coordinate values extracted by the process in step S92 and the result of the multiplication is temporarily stored into the RAM 68. Then, the processing routine is returned to step S92. On the contrary, if YES in step S93, step S95 follows. In step S95, the outline of the character expressed by the coordinate values which have temporarily been stored into the RAM 68 is formed and the inside of the character pattern is painted out.

After that, the processing routine is returned to the flow of FIG. 8.

After the character pattern was formed as mentioned above, step S86 follows and the character pattern formed by the above process is stored into the dot character pattern storage section 68b. Then, the processing routine is returned to step S82.

On the other hand, if YES in step S83, the processing routine is finished. The apparatus controls the output section 69 so as to print by the character size and resolution which were instructed by the host computer and waits for the reception of data.

By the above-described processes, the dot character patterns corresponding to the respective resolutions which can be output by the printing apparatus are stored into the dot character pattern storage section 68b. Therefore, even if a change in resolution and logic character size is instructed from the host computer 62 the apparatus can immediately cope with such a change.

Figure 10:
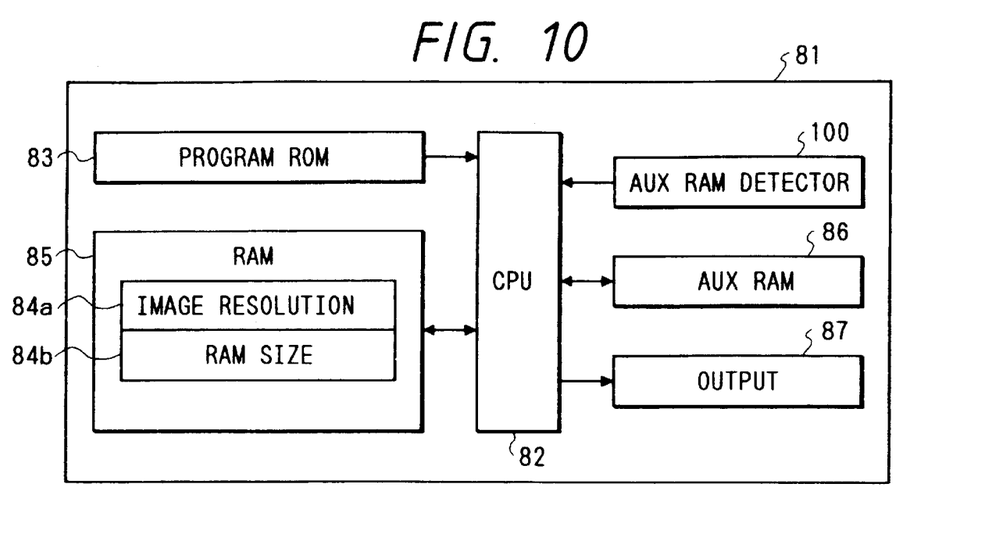
FIG. 10 is a block arrangement diagram of a printing apparatus showing an embodiment of the invention.

FIG. 10 is a block diagram showing the fifth embodiment of the invention.

A printing apparatus 81 in the fifth embodiment comprises: a CPU 82; a program ROM 83; a RAM 85; a auxiliary RAM 86; an auxiliary RAM detector 100; and an output section 87.

The CPU 82 controls the whole apparatus on the basis of program stored in the program ROM 83. Particularly, a program shown in a flowchart of FIG. 11, which will be explained hereinafter, is stored in the program ROM 83.

The RAM 85 is provided as a standard equipment in the printing apparatus 81 and is used as a work area when the CPU 82 executes the program. The RAM 85 has therein: an image resolution storage section 84a to store data of the output resolution; and a RAM size storage section 84b to store data of the RAM size which can be used.

The auxiliary RAM 86 is connectable to and detachable from the printing apparatus 81. The printing apparatus 81 can cope with the character patterns of plurality of kinds of RAM sizes. On the other hand, addresses in the auxiliary RAM 86 are continuous with addresses in the RAM 85.

The auxiliary RAM detector 100 detects the size of RAM provided as the auxiliary RAM 86.

The output section 87 outputs an image onto a recording paper.

Figure 11:
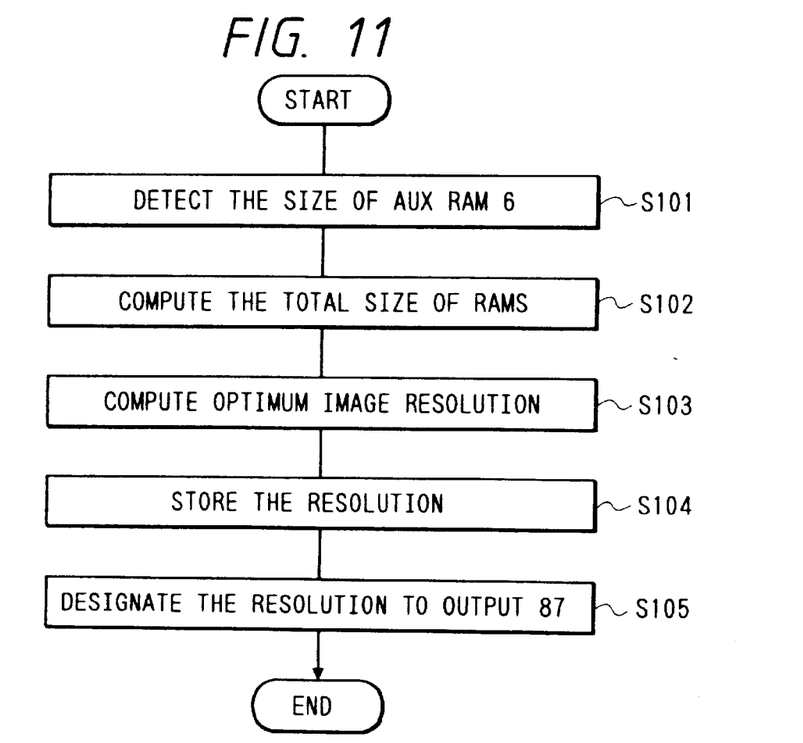
FIG. 11 is a flowchart showing a control procedure of the embodiment of FIG. 10.

FIG. 11 is the flowchart showing a control procedure to be executed by the CPU 82.

Fitst, when a power source is supplied to the printing apparatus 81, the size of auxiliary RAM 86 is detected by the detector 100 (step S101). The total RAM size with the RAM sizes in the RAM 85 is calculated and stored into the RAM size storage section 84b (step S102).

Then, the RAM size stored in the storage section 84b is extracted and the optimum output resolution is calculated (step S103).

In the embodiment, a region T of all of the RAMs 85 and 86 is calculated by distributing to a data region D which depends on the display resolution and a data region I which does not depend on the display resolution. On the other hand, the region D linearly changes with an increase/decrease in output resolution R. Assuming that a change ratio is set to X, in the embodiment, the region D can be obtained by the equation D=R×X. Therefore, the maximum output resolution R which satisfies the relation R≦(T−I)/X can be obtained from the total RAM size T.

Then, the output resolution R obtained in step S103 is stored into the image resolution storage section 84a (step S104). The output resolution can be instructed to the output section 87 (step S105).

By the above procedure, the printing apparatus 81 can output an image by the proper resolution according to the RAM size.

Although the embodiment has been described with respect to the case where the auxiliary RAM 86 comprises one slot, the invention can be also applied to the case where the auxiliary RAM is constructed of two or more RAMS, connected to the apparatus 81 by two or more slots. On the other hand, even in the case where the relation between the resolution and the necessary RAM size is not linear, the optimum resolution can be also calculated by properly defining the relation.

As described above, according to the invention, by providing the optimum output resolution information for a memory medium in which the dot pattern characters were stored and by switching the output resolution in accordance with the resolution, it is possible to automatically print at the resolution suitable for the dot pattern characters provided. Thus, there is no need to designate the resolution each time the memory medium is exchanged.

On the other hand, according to the invention, when actually printing, there is no need to generate the corresponding character pattern each time of the printing, so that the throughput of the apparatus itself can be improved.

According to the invention, by obtaining the optimum output density from the usable memory size, the optimum printing quality, printing speed, and the like can be set.

I claim:

1. A control apparatus comprising:
   memory means for storing memory capacity information representing a memory capacity upon supplying power to said control apparatus;
   control means for controlling a grade of an image to be output on the basis of the memory capacity information stored in said memory means; and
   output means for outputting the image at the grade controlled by said control means.

2. An apparatus according to claim 1, further comprising means for detecting a change in memory capacity, wherein said memory means stores the memory capacity information in response to the change in memory capacity detected by said detecting means.

3. An apparatus according to claim 2, wherein said detecting means further detects whether a detachable auxiliary memory is attached to said apparatus.

4. An apparatus according to claim 2, wherein said control means derives the highest possible grade of an image.

5. An apparatus according to claim 1, wherein said control means derives the highest possible grade of an image.

6. An apparatus according to claim 2, wherein said output means comprises a laser beam printer for outputting data at the grade of an image controlled by said control means.

7. An apparatus according to claim 2, wherein said detecting means derives the memory capacity information which can be used for data output.

8. An apparatus according to claim 2, wherein said control means controls the grade of an image for outputting data at the grade of an image in a printer engine.

9. An apparatus according to claim 2, wherein said control means further derives the memory capacity dependent on the grade of an image and memory capacity independent of the grade of an image to compute the grade of an image.

10. An apparatus according to claim 2, wherein said detecting means derives the entire memory capacity so that said apparatus can control the change in grade of an image.

11. An apparatus according to claim 2, wherein said detecting means detects the change in memory capacity upon supply of power to said apparatus.

12. An apparatus according to claim 2, wherein said control means controls the change in grade of an image upon supply of power to said apparatus.

13. An apparatus according to claim 8, wherein the grade of an image represents resolution.

14. A control method for a control apparatus, said method comprising the steps of:
   storing memory capacity information representing a memory capacity upon supplying power to the control apparatus;
   controlling a grade of an image to be output on the basis of the stored memory capacity information; and
   outputting the image at the grade controlled in said controlling step.

15. A method according to claim 14, further comprising the step of detecting a change in memory capacity, wherein said storing step includes storing the memory capacity information in response to the detected change in memory capacity.

16. A method according to claim 15, wherein said detecting step includes detecting whether a detachable auxiliary memory is attached to an apparatus in which said method is carried out.

17. A method according to claim 15, wherein said controlling step includes deriving the highest possible grade of an image.

18. A method according to claim 15, further comprising the step of outputting data, using a laser beam printer, at the grade of an image controlled in said controlling step.

19. A method according to claim 15, wherein said detecting step includes deriving the memory capacity information which can be used for data output.

20. A method according to claim 15, wherein said controlling step includes controlling the grade of an image for outputting data at the grade of an image in a printer engine.

21. A method according to claim 15, wherein said controlling step includes deriving the memory capacity dependent on the grade of an image and memory capacity independent of the grade of an image to compute the grade of an image.

22. A method according to claim 15, wherein said detecting step includes deriving the entire memory capacity so that said method can control the grade of an image.

23. A method according to claim 15, wherein said detecting step includes detecting the entire memory capacity so that said control means controls the grade of an image.

24. A method according to claim 15, wherein said controlling step includes controlling the grade of an image upon supplying power to an apparatus in which said method is carried out.

25. A method according to claim 14, wherein the grade of an image represents resolution.

26. A memory medium which stores a program for causing, when executed, a control apparatus to perform a control method, said method comprising the processes of:

detecting a memory capacity upon supplying power to the control apparatus;

controlling a grade of an image to be output on the basis of a result obtained in said detecting process; and outputting the image at the grade controlled in said controlling process.

27. A memory medium according to claim 26, wherein said detecting process detects whether a detachable auxiliary memory is attached to the apparatus in which said program is executed.

28. A memory medium according to claim 26, wherein said controlling process derives the highest possible grade of an image.

29. A memory medium according to claim 26, wherein said detecting process derives the memory capacity which can be used for data output.

30. A memory medium according to claim 26, wherein said controlling process derives the memory capacity dependent on the grade of an image and memory capacity independent of the grade of an image to compute the grade of an image.

31. A memory medium according to claim 26, wherein said detecting process derives the entire memory capacity so that the apparatus in which said memory medium is mounted can control the grade of an image.

32. A memory medium according to claim 26, wherein said detecting process detects the change in memory capacity upon supply of power to the apparatus in which said program is executed.

33. A memory medium according to claim 26, wherein said controlling process controls the grade of an image upon supply of power to the apparatus in which said program is executed.

34. A memory medium according to claim 26, wherein the grade of an image represents resolution.

35. A control apparatus according to claim 1, wherein the memory capacity information stored in said memory means represents a memory capacity dependent on a grade of an image.

36. A control apparatus according to claim 1, wherein the memory capacity is changeable and memory addresses after a memory capacity change are continuous with addresses before the memory capacity change.

37. A control method according to claim 14, wherein the memory capacity information stored in said memory step represents a memory capacity dependent on a grade of an image.

38. A control method according to claim 14, wherein the memory capacity is changeable and memory addresses after a memory capacity change are continuous with addresses before the memory capacity change.

39. A memory medium according to claim 26, wherein the memory capacity depends on a grade of an image.

40. A memory medium according to claim 26, wherein the memory capacity is changeable and memory addresses after a memory capacity change are continuous with addresses before the memory capacity change.

\* \* \* \* \*

UNITED STATES PATENT AND TRADEMARK OFFICE
CERTIFICATE OF CORRECTION

PATENT NO. : 5,909,538

DATED : June 1, 1999

INVENTOR(S) : MASAKATSU SAKURAI

It is certified that error appears in the above-identified patent and that said Letters Patent is hereby corrected as shown below:

COLUMN 1

Line 31, "preferred" should read --performed--.

COLUMN 2

Line 36, "an" should read --a fifth--; and
Line 63, "hereinlater." should read --hereinafter.--.

COLUMN 3

Line 36, "cartridge 6 It" should read
--cartridge 6. ¶ It--; and
Line 67, "It" should read --If--.

COLUMN 4

Line 5, "section 5." should read --section 5b.--;
Line 14, "(now" should read --(not--;
Line 22, "resolutions" should read --resolution--; and
Line 38, "an" should read --a--.

COLUMN 5

Line 67, "enough" should read --sufficient--.

COLUMN 6

Line 3, "an" should read --a--;
Line 36, "section 68ais" should read --section 68a is--;
Line 44, close up right margin;
Line 45, close up left margin; and
Line 67, "a" (fourth occurrence) should read --an--.

UNITED STATES PATENT AND TRADEMARK OFFICE
CERTIFICATE OF CORRECTION

PATENT NO. : 5,909,538
DATED : June 1, 1999
INVENTOR(S) : MASAKATSU SAKURAI

It is certified that error appears in the above-identified patent and that said Letters Patent is hereby corrected as shown below:

COLUMN 7

Line 15, "plurality" should read --a plurality--; and
    Line 24, "Fitst," should read --First,--.

COLUMN 8

Line 47, "claim 8," should read --claim 1--.

Signed and Sealed this

Twenty-third Day of November, 1999

Attest:

Q. TODD DICKINSON

*Attesting Officer*      *Acting Commissioner of Patents and Trademarks*